United States Patent [19]

Zickwolf, Jr.

[11] Patent Number: 5,379,583
[45] Date of Patent: Jan. 10, 1995

[54] CLOSED LOOP STATOR VANE CONTROL

[75] Inventor: Herbert C. Zickwolf, Jr., Bosrah, Conn.

[73] Assignee: United Technologies Corporation, Hartford, Conn.

[21] Appl. No.: 164,078

[22] Filed: Dec. 8, 1993

[51] Int. Cl.6 .............................................. F02C 9/20
[52] U.S. Cl. .............................. 60/39.29; 364/431.02
[58] Field of Search ...................... 60/39.27, 39.29; 364/431.02; 415/26, 27, 28, 36, 37

[56] References Cited

U.S. PATENT DOCUMENTS 5,165,845  11/1992  Khalid .................... 415/17

Primary Examiner—Louis J. Casaregola
Attorney, Agent, or Firm—Robert E. Greenstien

[57] ABSTRACT

In a gas turbine with stator vanes, actual high speed rotor speed is compared with a value computed from engine pressure to produce an error signal. The error signal is integrated to command stator deflection.

5 Claims, 2 Drawing Sheets

CLOSED LOOP STATOR VANE CONTROL

TECHNICAL FIELD

This invention relates to gas turbine engines, in particular, aircraft gas turbine engines having stator vanes and related controls.

BACKGROUND OF THE INVENTION

Stator vanes are commonly used in gas turbine engines to control the aerodynamic characteristics of the compressor blades and, as a result, compressor flow and compressor stage pressure drop. A major use for stator vanes is in controlling compressor stall.

A typical stator vane control is mainly a mechanical system with linkages and arms to change the orientation of stator vanes in the airflow path to the compressor blades. U.S. Pat. No. 4,995,786 is representative of a stator control in use on gas turbine engines. An unavoidable limitation with these systems is imprecision in controlling stator vane angle or deflection (SVA) resulting from manufacturing tolerances, hysteresis and other inaccuracies in the stator control path. This has an impact on engine design, particularly high performance aircraft engines. Those losses produce "slop" in the control path between the stator vane control input and the stator vanes. An effect is that the compressor does not necessarily operate with optimum flow at a particular compressor speed; the flow may surge with small shifts in vane deflection caused by those control path losses. To compensate for this, the compressor can be designed with extra surge margin for a worse case condition, just in case the SVA is not what it should be when peak power is suddenly demanded. But, this over design limits peak performance, especially during rapid acceleration and deceleration.

DISCLOSURE OF THE INVENTION

An object of the present invention is to provide a gas turbine engine with superior compressor capability by minimizing the need to compensate for errors in SVA due to mechanical errors.

According to the present invention, it is recognized that for any particular compressor pressure (HPC/PR), there is an optimum corrected value for compressor speed (N2C). From compressor pressure, a value for N2C is computed. Actual N2 is sensed and adjusted for temperature to provide a corrected value that is compared with the computed value, producing an error. The error is processed to provide a value or parameter for which is employed to command SVA.

According to one aspect of the invention, the parameter is integrated, the output being the commanded SVA that is supplied to the stator vane control.

According to another aspect of the invention, the corrected value of N2 is supplied to a lead/lag filter, producing an output that is summed with the computed value for N2C.

According to another aspect of the invention, the error produced from the summing process is applied to a multiplier to produce a signal that is then integrated to command SVA.

Among the features of the present invention is that it provides improved compressor operation during rapid accelerations and that the compressor operates much closer to it most efficient operating points at all compressor speeds, reducing the need to design the compressor on the assumption that air flow may vary dramatically (surge) because of uncertain stator vane deflection due to mechanical hysteresis and feedback and linkage inaccuracies. Other objects, benefits and features of the invention will be apparent to one skilled in the art from the following discussion and drawings.

BEST MODE FOR CARRYING OUT THE INVENTION

Figure 1:
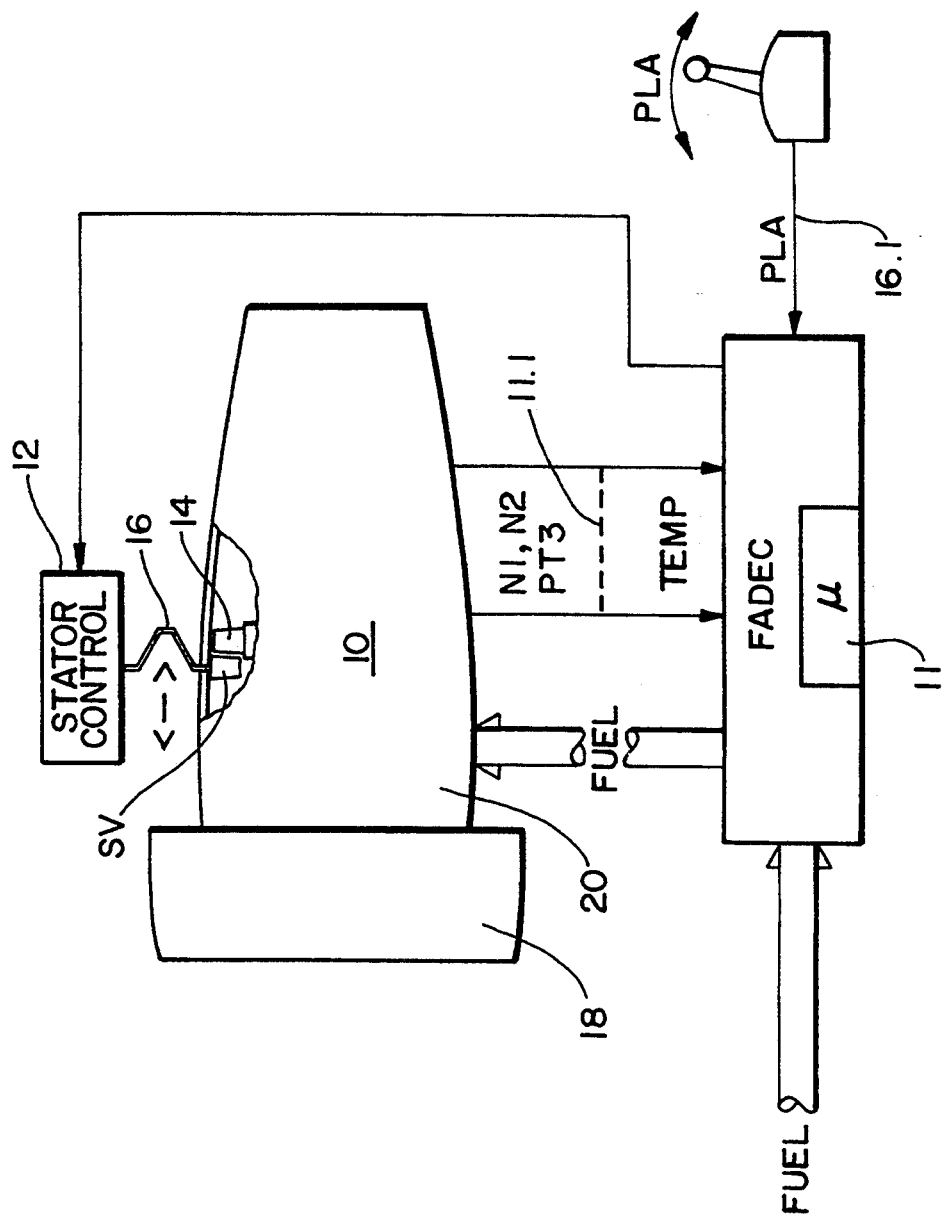
FIG. 1 is a functional block diagram showing a gas turbine engine with a turbofan and an electronic fuel control, stator vanes and a related stator vane control.

Referring to FIG. 1 a turbofan fan aircraft engine 10 is shown. A so called "full authority digital engine control" or FADEC contains a microprocessor $\mu$ (signal processor) capable of being programmed to carry out the routines that embrace the present invention and also store appropriate data in a temporary memory (e.g. RAM), which being well known is not shown. The invention resides in the manner in which information on instantaneous engine operating conditions are received and processed in the FADEC to control fuel flow to the engine and also the operation of a slator control 12, which regulates the angle of stator vanes SV, one vane being shown in front of one of a plurality of compressor blades 14. As the aforementioned patent demonstrates and is well known, there are, in the typical gas turbine, many stages of these stator vanes associated with different compressor stages. The vanes in these stages may be considered for present purposes to be regulated in unison by the stator control 12 by a simplistically shown mechanical linkage 16, which is moved back and forth, so to speak, to adjust the orientation of the stator and thereby airflow to the leading edge of the compressor blade 14.

The FADEC receives an engine power command from a throttle lever that is advanced through different magnitudes of power lever advance PLA. The FADEC, using the microprocessor engine, provides more or less fuel to the engine in response to PLA, which is provided over the input line 16.1. Signals are received from the engine by the FADEC on data lines 11.1, among them signals indicating the speed N1 of a turbofan 18 section (fan not shown), compressor speed N2, pressure $PT_{2.5}$ (at location 2.5 according to conventional engine location nomenclature) and compressor temperature TEMP. Pressure $PT_{2.5}$ is the pressure near the beginning of the compressor stage (shown generally by numeral 20), which is immediately aft of the fan 18.

Figure 2:
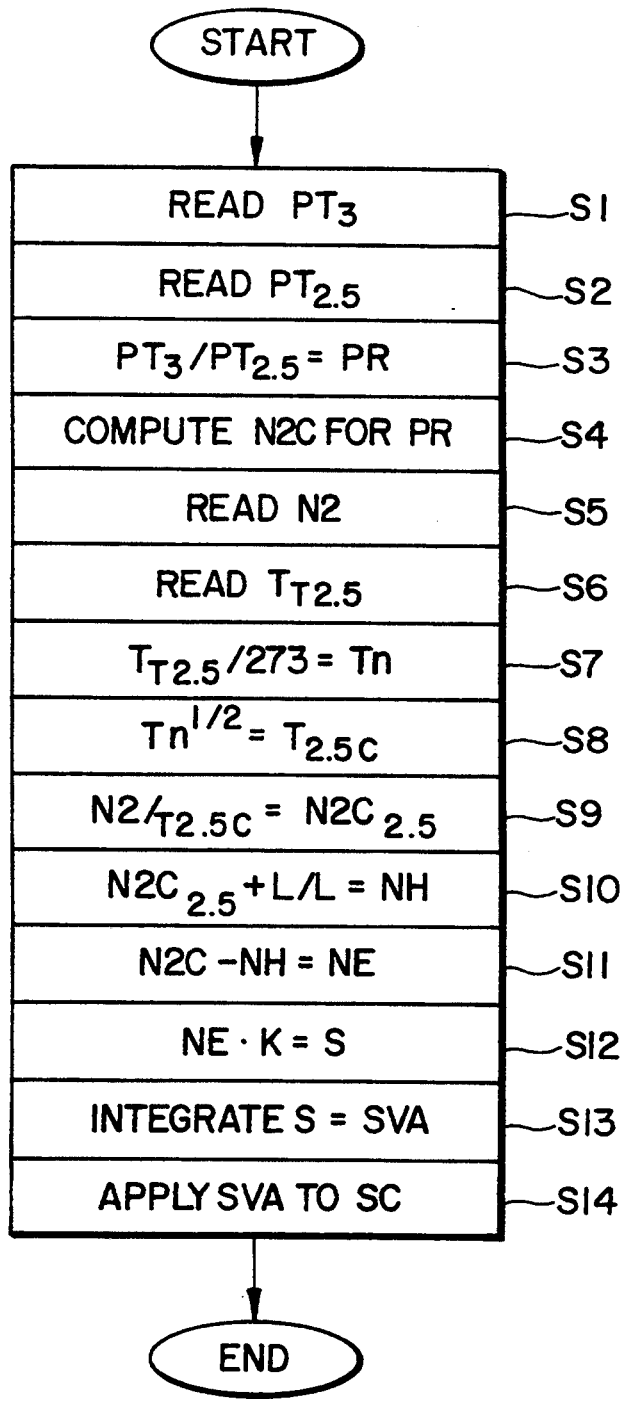
FIG. 2 is a flow chart of the steps used, according to the present invention, to control stator vane deflection (SVA).

Referring to FIG. 2, assuming the engine is operating a certain speed, the pressure $PT_3$ (compressor exit) is read at step 1. At step $S_2$, the pressure $PT_{2.5}$ is read. The value of $PT_3/PT_{2.5}$ is computed as a value PR (pressure across the compressor) in step S3. The value of N2C for PR is computed at step S4 based on a stored table for the compressor that indicates what the value of N2C should be for PR. At step S5, the value for N2 (high speed rotor speed) or actual N2 is read. Step S6 reads the temperature value at location 2.5, which is used in step S7 to compute a value $T_n$ using the fixed correct of 273 degrees C., as shown. In step S8, $T_{2.5c}$ is computed as the square root of Tn. The high speed rotor speed at location 2.5, but corrected for temperature, is computed at step S9, producing the $N2C_{2.5}$. In step S10, the value $N2C_{2.5}$ is applied to a filter (lead/lag or L/L) to provide a phase shift, producing a value NH, which is summed with N2C at step S11 to producing an error value NE. The value NE is multiplied by a gain factor K in step S12 and then integrated at step S13, producing the value for SVA (stator vane angle) which is applied, in step S14, to the stator control 12., causing a change in stator vane angle or deflection in relation to the magnitude of the integral of the SVA value produced at step S13.

By putting the lead/lag before the summing operation and applying the gain or amplification after the summing operation smooth control is provided by avoiding large excursions in the error signal during rapid acceleration and deceleration conditions ("snap accels and decels"). Other compensation may used to accomplish the same purpose, for instance, feedthrough with proportional-integral and differential transfer qualities.

The foregoing is a description of the best mode for carrying out the invention, and even though some modifications and variations may have been suggested, others may be made in whole or in part by one skilled in the art without departing from the true scope and spirit of the invention.

I claim:

1. A gas turbine engine comprising stators and a stator control and an engine control having a signal processor responsive the engine operating parameters for controlling the engine, characterized in that:

the signal processor comprises means for providing a first signal manifesting compressor speed for instantaneous pressure across the compressor based on a stored relationship between pressure across the compressor and compressor speed; for storing said relationship; for summing said first signal with a second signal manifesting compressor speed to produce an error signal manifesting the difference between actual compressor speed and the compressor speed manifested by said first signal; for integrating said error signal to provide a fourth signal manifesting a stator deflection; for applying said fourth signal to the stator control.

2. The gas turbine engine described in claim 1, further characterized in that:

the signal processing means comprises means for amplifying said error signal by a stored gain factor to produce said fourth signal.

3. The gas turbine engine described in claim 2, further characterized in that:

the signal processing means comprises means for providing phase compensation to said second signal before summing said second with said first signal.

4. The gas turbine engine described in claim 1, further characterized in that the signal processor comprises means for determining said instantaneous pressure by receiving two signals, each representing compressor pressure at different compressor stages, and determining the ratio of said signals.

5. The gas turbine engine described in claim 3, further characterized in that the signal processor comprises means for determining said instantaneous pressure by receiving two signals, each representing compressor pressure at different compressor stages, and determining the ratio of said signals.

* * * * *